(12) United States Patent
Kaluza et al.

(10) Patent No.: US 11,511,633 B2
(45) Date of Patent: Nov. 29, 2022

(54) APPARATUS, SYSTEM, AND METHOD FOR CHARGING AN ENERGY ACCUMULATOR, AND VEHICLE

(71) Applicant: Bayerische Motoren Werke Aktiengesellschaft, Munich (DE)

(72) Inventors: Sebastian Kaluza, Munich (DE); Isaac Lund, Salinas, CA (US); Simon Lux, Munich (DE); Pascal Viala, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 373 days.

(21) Appl. No.: 16/671,624

(22) Filed: Nov. 1, 2019

(65) Prior Publication Data

US 2020/0062142 A1 Feb. 27, 2020

Related U.S. Application Data

(63) Continuation of application No. PCT/EP2018/060905, filed on Apr. 27, 2018.

(30) Foreign Application Priority Data

May 3, 2017 (DE) ...................... 10 2017 207 416.7

(51) Int. Cl.
*B60L 53/12* (2019.01)
*H01M 10/615* (2014.01)
(Continued)

(52) U.S. Cl.
CPC ............... *B60L 53/12* (2019.02); *B60L 58/12* (2019.02); *B60L 58/27* (2019.02); *H01M 10/44* (2013.01);
(Continued)

(58) Field of Classification Search
CPC .......... B60L 53/12; B60L 58/12; B60L 58/27; B60L 2240/545; B60L 58/24;
(Continued)

(56) References Cited

U.S. PATENT DOCUMENTS

| 4,081,737 A | 3/1978 | Miyahara |
| 2011/0052944 A1 | 3/2011 | Matthias et al. |

(Continued)

FOREIGN PATENT DOCUMENTS

| CN | 102005624 A | 4/2011 |
| CN | 103682525 A | 3/2014 |

(Continued)

OTHER PUBLICATIONS

PCT/EP2018/060905, International Search Report dated Aug. 10, 2018 (Three (3) pages).

(Continued)

*Primary Examiner* — Paul Dinh
(74) *Attorney, Agent, or Firm* — Crowell & Moring LLP

(57) ABSTRACT

A charging device for charging the electrochemical energy accumulator has a first circuit which is or can be coupled electrically to the electrochemical energy accumulator. A heating device for heating the electrochemical energy accumulator has a second circuit, separate from the first circuit, having an induction heating element which can be heated inductively by an external magnetic alternating field and which is or can be coupled thermally to the electrochemical energy accumulator.

18 Claims, 1 Drawing Sheet

(51) Int. Cl.
  *H01M 10/657* (2014.01)
  *H02J 50/10* (2016.01)
  *B60L 58/27* (2019.01)
  *H01M 10/44* (2006.01)
  *H01M 10/48* (2006.01)
  *H02J 7/02* (2016.01)
  *H05B 6/10* (2006.01)
  *B60L 58/12* (2019.01)

(52) U.S. Cl.
  CPC ....... *H01M 10/486* (2013.01); *H01M 10/615* (2015.04); *H01M 10/657* (2015.04); *H02J 7/025* (2013.01); *H02J 50/10* (2016.02); *H05B 6/10* (2013.01); *H01M 2220/20* (2013.01)

(58) Field of Classification Search
  CPC .. H01M 10/44; H01M 10/486; H01M 10/615; H01M 10/657; H01M 2220/20; H02J 7/025; H02J 50/10; H05B 6/10; Y02E 60/10; Y02T 10/7072; Y02T 10/70; Y02T 90/14
  USPC ......................................................... 320/108
  See application file for complete search history.

(56) References Cited

U.S. PATENT DOCUMENTS

2013/0313249 A1  11/2013  Cregut et al.

2017/0279316 A1* 9/2017 Inoue .................. H02J 7/04
2018/0126177 A1* 5/2018 Scott .................. A61B 5/6867

FOREIGN PATENT DOCUMENTS

| CN | 104723893 A | 6/2015 |
| CN | 104935020 A | 9/2015 |
| DE | 10 2009 029 093 A1 | 3/2011 |
| DE | 10 2010 000 267 A1 | 8/2011 |
| DE | 10 2010 044 999 A1 | 3/2012 |
| DE | 10 2012 110 562 A1 | 7/2013 |
| DE | 10 2012 201 091 A1 | 7/2013 |
| DE | 10 2012 210 032 A1 | 12/2013 |
| EP | 2 567 856 A1 | 3/2013 |
| JP | 2014-209813 A | 11/2014 |

OTHER PUBLICATIONS

German Search Report issued in German counterpart application No. 10 2017 207 416.7 dated Dec. 21, 2017, with Statement of Relevancy (Eleven (11) pages).
Chinese Office Action issued in Chinese application No. 201880028511.0 dated Jul. 25, 2022, with English translation (Twenty (20) pages).

* cited by examiner

APPARATUS, SYSTEM, AND METHOD FOR CHARGING AN ENERGY ACCUMULATOR, AND VEHICLE

CROSS REFERENCE TO RELATED APPLICATIONS

This application is a continuation of PCT International Application No. PCT/EP2018/060905, filed Apr. 27, 2018, which claims priority under 35 U.S.C. § 119 from German Patent Application No. 10 2017 207 416.7, filed May 3, 2017, the entire disclosures of which are herein expressly incorporated by reference.

BACKGROUND AND SUMMARY OF THE INVENTION

The invention relates to a device, to a system and to a method for charging an electrochemical energy store, in particular a vehicle battery, and to a vehicle having such a system.

To supply electrically driven vehicles, in particular automobiles, with the required energy, electrochemical energy stores are generally provided in the vehicles. Various charging standards exist for recharging the energy stores. The vehicles may usually be connected to the public electricity grid or use special power charging points that provide AC, three-phase or DC current for charging purposes depending on the standard. As alternatives to wired energy transfer systems, wireless energy transfer systems are also being developed, these allowing particularly convenient and simple charging of the energy stores.

To allow efficient and considerate recharging of the energy stores, charge is usually drawn from the energy stores and this charge is used to heat the energy stores during the charging procedure. For this purpose, a resistive heating element may for example be integrated into the energy store or arranged in the region of the energy store, by virtue of which the energy store is able to be heated to a predefined or required temperature.

One object of the invention is to further improve the charging procedure of an electrochemical energy store, in particular to allow a high power consumption by the energy store with at the same time increased service life of the energy store.

A device according to the invention for charging an electrochemical energy store, in particular a vehicle battery, has a charging apparatus and a heating apparatus. The charging apparatus is configured so as to charge the electrochemical energy store and has a first current circuit that is electrically coupled or is able to be electrically coupled to the electrochemical energy store. The heating apparatus is configured so as to heat the electrochemical energy store and has a second current circuit, separate from the first current circuit, having an induction heating element able to be heated inductively by an external magnetic alternating field, wherein the induction heating element is thermally coupled or is able to be thermally coupled to the electrochemical energy store.

A system according to the invention for charging an electrochemical energy store has an electrochemical energy store, in particular a vehicle battery, and a device according to the invention for charging the electrochemical energy store.

A vehicle according to the invention, in particular a motor vehicle, has a system according to the invention for charging an electrochemical energy store.

A method according to the invention for charging an electrochemical energy store, in particular a vehicle battery, has the following steps: generating an external magnetic alternating field; heating the electrochemical energy store by way of an induction heating element thermally coupled to the electrochemical energy store, which induction heating element is heated inductively by the external magnetic alternating field; and charging the electrochemical energy store by electrically coupling a first current circuit, which is separate from a second current circuit having the induction heating element, to the electrochemical energy store.

One aspect of the invention is based on the approach of heating an electrochemical energy store prior to charging and/or during charging by way of an induction heating element, wherein a first current circuit is provided for charging purposes and a second current circuit that is in particular spatially and/or electrically separate from the first current circuit and is thus able to be controlled independently is provided for heating purposes. As a result, the heating process is able to be controlled independently from the charging process and adjusted for example to the state of charge and/or a temperature of the energy store or to an ambient temperature.

Since the induction heating element is heated inductively by the external magnetic alternating field, the procedure of heating the energy store may be controlled or influenced externally, that is to say from outside a vehicle in which the energy store is situated. The heating power is in this case in particular provided externally and does not have to be drawn from the energy store itself, as a result of which this is able to be subjected to less load and its service life is able to be increased.

Overall, the invention allows improved, in particular efficient, charging of an energy store that preserves the energy store.

The inductive heating of the induction heating element or of the energy store is preferably started as soon as the vehicle is positioned, in particular parked, in the region of a power charging point or in a parking space, for instance in a garage. As a result, the energy store may already be brought to a temperature, in particular above a melting point of an electrolyte contained in the energy store, before the actual charging process start, for example by connecting a charging cable to the charging apparatus.

In one preferred configuration, the first current circuit has an induction element in which a current for charging the electrochemical energy store is able to be induced by the external magnetic alternating field. The induction element is preferably designed as a coil that is able to be penetrated by the magnetic flux of the external magnetic alternating field. As a result, the energy of the external magnetic alternating field may advantageously be used both to heat the electrochemical energy store prior to the charging process or during the charging process and to charge the electrochemical energy store.

In a further preferred configuration, the induction element has a first coil that is configured so as to absorb energy of the external magnetic alternating field at the first harmonic (fundamental frequency) of the external magnetic alternating field. In this case, the absorption at the first harmonic of the magnetic alternating field allows a particularly efficient transfer of the energy in order to charge the energy store.

In a further preferred configuration, the induction heating element has a high-resistance second coil that is configured so as to absorb energy of the external magnetic alternating field at the first harmonic (fundamental frequency) and/or a higher harmonic of the external magnetic alternating field.

The second coil is in this case preferably made from a material having a high electrical resistance, in particular a specific resistance of 0.1 $\Omega mm^2/m$ or higher, preferably of 0.4 $\Omega mm^2/m$ or higher, in particular of 1 $\Omega mm^2/m$ or higher. The second coil is in this case preferably made from one or more alloys that contain nickel, manganese, copper and/or chromium and/or transition metal compounds. A situation is thereby able to be achieved whereby the second coil heats up to a great extent upon absorbing the energy of the external magnetic alternating field. This allows efficient and reliable heating of the energy store.

Since the second coil is configured so as to absorb energy of the external magnetic alternating field at a higher harmonic of the external magnetic alternating field, the amount of energy absorbed by the second coil is able to be adjusted independently of the energy coupled into the first coil of the first current circuit at the first harmonic. A majority, in particular more than half, of the energy of the external magnetic alternating field may in particular be used to charge the energy store and a smaller proportion, in particular less than half, of the energy of the external magnetic alternating field may be used to heat the energy store. As a result, excessive heating of the energy store is able to be avoided and the energy store is able to be charged efficiently.

In a further preferred configuration, the heating apparatus has a line arranged in the region of the induction heating element, which line is configured so as to transport a medium able to be heated by the heated induction heating element to the electrochemical energy store. As a result, reliable thermal coupling of the induction heating element to the electrochemical energy store may be made possible. It is in particular in this case not absolutely necessary to arrange the energy store in the region of the second current circuit or induction heating element, as a result of which it is made significantly easier to integrate the device according to the invention in a vehicle. In this configuration, the energy store may preferably be heated without the energy store being put into operation, as a result of which power losses due to what is known as a standing voltage are able to be avoided during heating.

The line is in this case preferably arranged, in particular wound, around the induction heating element, in particular in a spiral shape. As an alternative, however, the induction heating element may also be arranged, in particular wound, around the line, in particular in a spiral shape. In both cases, the heatable medium is heated efficiently and/or the emission of non-useful heat losses is reduced.

In a further preferred configuration, the line is integrated, in particular cut, into the induction heating element, as a result of which the gravimetric power of the system is able to be increased significantly.

It is furthermore preferable to use a coolant of an energy store cooling system as heatable medium, which coolant is designed to cool the energy store during operation, that is to say when drawing electrical energy from the energy store. The line arranged in the region of the induction heating element is preferably part of the energy store cooling system.

In a further preferred configuration, the device according to the invention has a control apparatus that is configured so as to control a first switching element of the first current circuit for interrupting or closing the first current circuit and/or a second switching element for interrupting or closing the second current circuit such that the electrochemical energy store heats up, in particular only heats up, in a first control mode, the electrochemical energy store is charged, in particular is only charged, in a second control mode, and the electrochemical energy store heats up and is charged at the same time in a third control mode. As a result, the energy of the external magnetic alternating field is able to be used in a targeted and efficient manner to heat and/or charge the energy store. The heating of the electrochemical energy store may furthermore be adjusted and controlled dynamically, for example with respect to the state of charge of the energy store.

In a further preferred configuration, the device according to the invention has a temperature sensor unit that is configured so as to record a temperature of the electrochemical energy store. The control apparatus is in this case preferably configured so as to change from the first control mode to the second control mode when the determined temperature reaches or exceeds a predefined temperature threshold value. As an alternative or in addition, the control apparatus is configured so as to change from the second control mode to the first control mode when the determined temperature falls below a predefined temperature threshold value. By virtue of both configurations, a situation whereby the energy store is charged at a low temperature, in particular below the melting point of an electrolyte of the energy store, is able to be reliably avoided. Considerate and efficient charging of the energy store is thus made possible.

In a further preferred configuration, the second current circuit has a temperature-dependent electrical resistance that regulates, in particular limits, the heating of the induction heating element or of the second current circuit upon reaching or exceeding the predefined temperature threshold value.

In a further preferred embodiment, the system according to the invention has an exciter coil apparatus for generating the external magnetic alternating field. The exciter coil apparatus is in this case preferably configured so as to generate the external magnetic alternating field at a stable predefined fundamental frequency, what is known as the first harmonic. As a result, the first and/or second coil of the first or second current circuit is easily able to be introduced into the external magnetic alternating field, such that an electric current for charging the energy store is able to be induced reliably or inductive heating of the induction heating element is able to be brought about.

Further features, advantages and application possibilities of the invention become apparent from the following description in connection with the figures, throughout which the same reference signs are used for the same or mutually corresponding elements of the invention. In the figures, at least partly schematically:

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
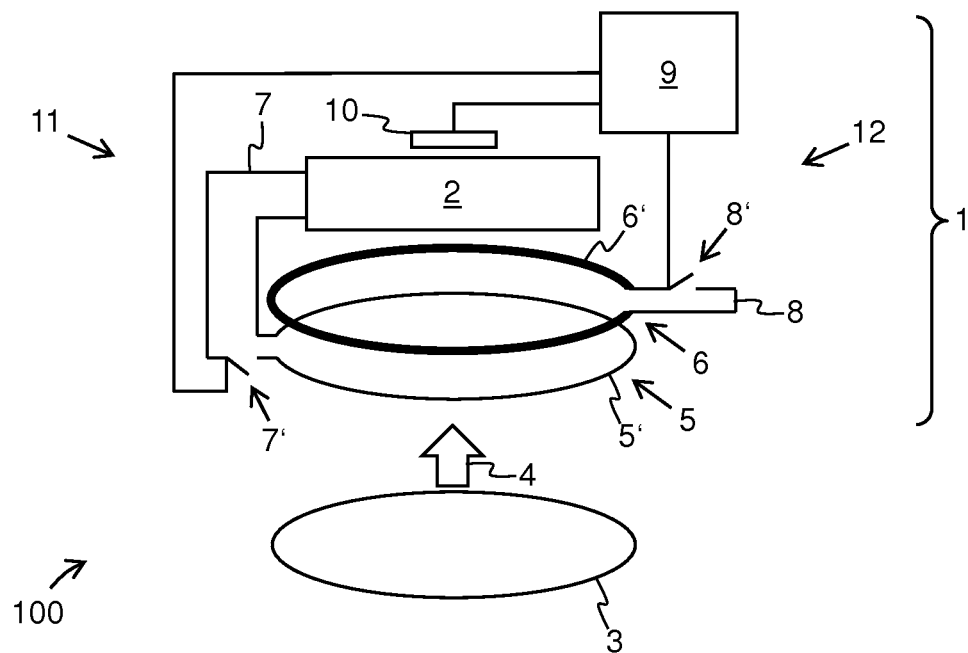
FIG. 1 shows one example of a system for charging an electrochemical energy store.

FIG. 1 shows one example of a system 100 for charging an electrochemical energy store 2 having a device 1 for charging the electrochemical energy store 2, which device has a charging apparatus 11 having an induction element 5 and a heating apparatus 12 having an induction heating element 6.

The system 100 furthermore has an exciter coil apparatus 3 that generates an external magnetic alternating field 4, illustrated schematically by an arrow in the figure, the magnetic flux of which magnetic alternating field penetrates a first coil 5' of the induction element 5 and a second coil 6' of the induction heating element 6. In this case, the polarity of the external magnetic alternating field 4 changes at a predefined fundamental frequency, what is known as the first harmonic. The fundamental frequency is preferably 40 to 130 kHz, preferably 60 to 110 kHz, in particular substantially 85 kHz. The external magnetic alternating field 4 thus induces a respective electric current in the first coil 5' and in the second coil 6'.

The exciter coil apparatus 3 and/or the first coil 5' and/or the second coil 6' are preferably aligned coaxially with respect to one another.

The first coil 5' is part of a first current circuit 7 that is electrically coupled to the electrochemical energy store 2. The current induced in the first coil 5' is used, possibly after rectification, to charge the electrochemical energy store 2.

The electric current induced in the second coil 6' or in the induction heating element 6 leads to heating of the induction heating element 6. The second coil 6' or the induction heating element 6 is part of a second current circuit 8 that is electrically and/or spatially separate from the first current circuit 7 and is thermally coupled to the electrochemical energy store 2. The thermal coupling may be achieved, as indicated in FIG. 1, for example by arranging the electrochemical energy store 2 in the region, in particular in the immediate vicinity, of the induction heating element 6.

The second coil 6' is preferably a high-resistance coil that has a high electrical resistance and is preferably made from a heat-conducting alloy or a resistive alloy, in particular in accordance with DIN 17471.

The first current circuit 7 has a first switching element 7' that is configured so as to close or interrupt the first current circuit 7. Likewise, the second current circuit 8 has a second switching element 8' that is configured so as to close or interrupt the second current circuit 8.

The first and second switching element 7', 8' may be controlled by a control apparatus 9 that preferably has three different control modes. In the first control mode, the first switching element 7' interrupts the first current circuit 7 and the second switching element 8' closes the second current circuit 8, such that an electric current is induced only in the induction heating element 6. As a result, the induction heating element 6 heats up without the energy store being charged. As a result, essentially all of the absorbed energy of the magnetic alternating field 4 is used to heat the energy store 2.

In the second control mode, the switching element 7' closes the first current circuit 7 and the second switching element 8' interrupts the second current circuit 8, such that an electric current is induced only in the induction element 5. As a result, essentially all of the absorbed energy of the magnetic alternating field 4 is used to charge the energy store 2.

In the third control mode, the switching element 7' closes the first current circuit 7 and the second switching element 8' closes the second current circuit 8, such that a respective electric current is induced both in the induction element 5 and in the induction heating element 6. The energy of the magnetic alternating field 4 is in this case absorbed both by the induction element 5 and by the induction heating element 6 and used to charge the energy store 2, on the one hand, and to heat the energy store 2 at the same time, on the other hand.

Both the first coil 5' and the second coil 6' are preferably configured so as to absorb the energy of the magnetic alternating field 4 at the first harmonic of the magnetic alternating field 4. In this case, the first and second coil 5', 6' each reach an absorption efficiency of approximately 98%. In the third control mode, the first and the second coil 5', 6' therefore absorb the energy of the magnetic alternating field 4 in substantially equal proportions, in particular at substantially 48%.

As an alternative, however, the second coil 6' may also be configured so as to absorb the energy of the magnetic alternating field 4 at the second or a higher harmonic of the magnetic alternating field 4. As a result, the absorption efficiency of the second coil 6' drops to substantially 45%. In the third control mode, the first coil 5' therefore absorbs a larger proportion of the energy of the magnetic alternating field 4 than the second coil 6'. The absorption ratio and therefore the charging and heating ratio of the first and second coils 5', 6' may thus be set, and the charging process may be designed in a particularly efficient manner.

A temperature sensor unit 10 is preferably arranged in the region of the energy store 2, which temperature sensor unit is configured so as to record a temperature of the energy store 2. The control apparatus 9 may control the opening or closure of the switching elements 7', 8', that is to say the closure or interruption of the first and/or second current circuit 7, 8, on the basis of the recorded temperature. The control apparatus 9 may in particular change to the first, second or third control mode on the basis of the determined temperature, or be operated in the first, second or third control mode depending on the determined temperature.

If a vehicle equipped with the energy store 2 and the device 1 for charging the energy store 2 is situated in a cold environment, such that the temperature of the energy store 2 lies below a temperature threshold value, for example the melting temperature of an electrolyte of the energy store 2, the control apparatus 9 may initially prompt heating of the energy store 2 in the first control mode. If the temperature of the energy store 2 has finally reached or exceeded the temperature threshold value, the control apparatus 9 may switch to the second control mode and prompt charging of the energy store 2. If the temperature should drop again during charging, there is a switch from the second control mode back to the first control mode. This ensures that the energy store 2 is charged considerately and efficiently.

Figure 2:
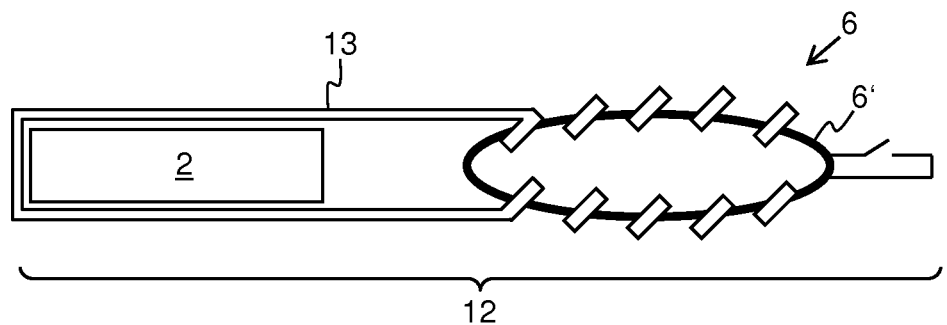
FIG. 2 shows one example of a heating apparatus and of an energy store.

FIG. 2 illustrates, by way of example, a heating apparatus 12 having an induction heating element 6 that is thermally coupled to an energy store 2.

The induction heating element 6 has a second coil 6', in particular a high-resistance coil, that is configured so as to absorb energy of an external magnetic alternating field (not illustrated), and heats up in the process. The induction heating element 6 is thermally coupled to the energy store 2 in this example by way of a line 13 that is configured so as to transport a heatable medium, for example a coolant, from the second coil 6' to the energy store 2.

The line 13 is in this case wound around the second coil 6' in the region of the induction heating element 6, such that the heat arising due to inductive heating in the second coil 6' is able to be absorbed and stored by the heatable medium when it flows through the line in the region of the induction heating element 6. The heated medium may then output the stored heat back to the energy store 2 in the region of the energy store 2.

The arrangement shown in FIG. 2 of the energy store 2, the line 13 and the induction heating element 6 is particularly advantageous since the energy store 2 and the induction heating element 6 do not have to be positioned in the immediate vicinity of one another in order to achieve reliable thermal coupling. This makes it significantly easier to integrate the energy store 2 and the heating apparatus 12 into the vehicle.

LIST OF REFERENCE SIGNS 1 device for charging an electrochemical energy store
2 electrochemical energy store
3 exciter coil apparatus
4 magnetic alternating field
5 induction element
5' first coil
6 induction heating element
6' second coil
7 first current circuit
8 second current circuit
9 control apparatus
10 temperature sensor apparatus
11 charging apparatus
12 heating apparatus
13 line
100 system for charging an electrochemical energy store The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A device for charging an electrochemical energy store, the device comprising:
   a first circuit, electrically coupled to the electrochemical energy store so as to charge the electrochemical energy store via a charging operation; and
   a second circuit, separate from the first circuit, the second circuit including:
      a heating element configured to generate heat via a heating operation that is independent of the charging operation, wherein the heating operation includes inducing a heating current in the second circuit by an external magnetic alternating field, and wherein the heating element is thermally coupled to the electrochemical energy store so as to conduct the generated heat to the electrochemical energy store.

2. The device according to claim 1, wherein the first circuit includes:
   an induction element configured such that a charging current that charges the electrochemical energy store is induced in the induction element by the external magnetic alternating field during the charging operation.

3. The device according to claim 2, wherein the induction element has a charging coil configured to absorb energy of the external magnetic alternating field at a first harmonic fundamental frequency of the external magnetic alternating field.

4. The device according to claim 1, wherein the heating element has a high-resistance coil configured to absorb energy of the external magnetic alternating field at a first harmonic fundamental frequency and/or a higher harmonic of the external magnetic alternating field.

5. The device according to claim 2, wherein the heating element has a high-resistance coil configured to absorb energy of the external magnetic alternating field at a first harmonic fundamental frequency and/or a higher harmonic of the external magnetic alternating field.

6. The device according to claim 1, further comprising: a line thermally coupling the heating element to the electrochemical energy store via a thermal medium transported therein.

7. The device according to claim 2, further comprising: a line thermally coupling the heating element to the electrochemical energy store via a thermal medium transported therein.

8. The device according to claim 3, further comprising: a line thermally coupling the heating element to the electrochemical energy store via a thermal medium transported therein.

9. The device according to claim 4, further comprising: a line thermally coupling the heating element to the electrochemical energy store via a thermal medium transported therein.

10. The device according to claim 1, further comprising:
    a first switch configured to close/open the first circuit so as to enable/disable the charging operation;
    a second switch configured to close/open the second circuit so as to enable/disable the heating operation; and
    a control apparatus configured to control the first switch and the second switch, respectively, according to:
       a first control mode, such that the heating operation is enabled and the charging operation is disabled,
       a second control mode, such that the charging operation is enabled and the heating operation is disabled, and
       a third control mode, such that the charging operation and the heating operation are enabled.

11. The device according to claim 2, further comprising:
    a first switch configured to close/open the first circuit so as to enable/disable the charging operation;
    a second switch configured to close/open the second circuit so as to enable/disable the heating operation; and
    a control apparatus configured to control the first switch and the second switch, respectively, according to:
       a first control mode, such that the heating operation is enabled and the charging operation is disabled,
       a second control mode, such that the charging operation is enabled and the heating operation is disabled, and
       a third control mode, such that the charging operation and the heating operation are enabled.

12. The device according to claim 3, further comprising:
    a first switch configured to close/open the first circuit so as to enable/disable the charging operation;
    a second switch configured to close/open the second circuit so as to enable/disable the heating operation; and
    a control apparatus configured to control the first switch and the second switch, respectively, according to:
       a first control mode, such that the heating operation is enabled and the charging operation is disabled,
       a second control mode, such that the charging operation is enabled and the heating operation is disabled, and
       a third control mode, such that the charging operation and the heating operation are enabled.

13. The device according to claim 10, further comprising:
    a temperature sensor unit configured to record a temperature of the electrochemical energy store, wherein the control apparatus is further configured to:

change from the first control mode to the second control mode when the recorded temperature reaches or exceeds a predefined temperature threshold value, and/or change from the second control mode to the first control mode when the recorded temperature falls below a predefined temperature threshold value.

14. The device according to claim 11, further comprising:

a temperature sensor unit configured to record a temperature of the electrochemical energy store, wherein the control apparatus is further configured to:

change from the first control mode to the second control mode when the recorded temperature reaches or exceeds a predefined temperature threshold value, and/or change from the second control mode to the first control mode when the recorded temperature falls below a predefined temperature threshold value.

15. The device according to claim 12, further comprising:

a temperature sensor unit configured to record a temperature of the electrochemical energy store, wherein the control apparatus is further configured to:

change from the first control mode to the second control mode when the recorded temperature reaches or exceeds a predefined temperature threshold value, and/or change from the second control mode to the first control mode when the recorded temperature falls below a predefined temperature threshold value.

16. A system for charging an electrochemical energy store, the system comprising:

an electrochemical energy store; and a device configured to charge the electrochemical energy store, the device comprising:

a first circuit electrically coupled to the electrochemical energy store so as to charge the electrochemical energy store via a charging operation, and a second circuit separate from the first circuit, wherein the second circuit includes:

a heating element configured to generate heat via a heating operation that is independent of the charging operation, wherein the heating operation includes inducing a heating current in the second circuit by an external magnetic alternating field, and wherein the heating element is thermally coupled to the electrochemical energy store so as to conduct the generated heat to the electrochemical energy store.

17. The system according to claim 16, further comprising:

an exciter coil apparatus configured to generate the external magnetic alternating field.

18. A method for charging an electrochemical energy store, the method comprising:

generating an external magnetic alternating field;

inducing a heating current in a heating element of a second circuit via the external magnetic alternating field, so as to cause the heating element to generate heat;

transferring the generated heat to the electrochemical energy store via a thermal coupling of the heating element to the electrochemical energy store; and charging the electrochemical energy store, independent of inducing the heating current, by electrically coupling a first circuit to the electrochemical energy store.

* * * * *